United States Patent [19]
Boone

[11] 3,974,590
[45] *Aug. 17, 1976

[54] SUBMERSION DEVICE WHICH CHANGES CONFIGURATION IN RESPONSE TO TEMPERATURE

[76] Inventor: George R. Boone, 4730 Ridgebury Drive, Dayton, Ohio 45440

[*] Notice: The portion of the term of this patent subsequent to Aug. 21, 1990, has been disclaimed.

[22] Filed: Aug. 16, 1973

[21] Appl. No.: 388,715

Related U.S. Application Data

[63] Continuation of Ser. No. 187,389, Oct. 7, 1971, Pat. No. 3,753,311.

[52] U.S. Cl.............................. 43/43.14; 43/42.22
[51] Int. Cl.² ....................................... A01K 93/00
[58] Field of Search............. 43/43.14, 42.22, 26.1, 43/26.2, 43.13, 43.14, 4, 42.03; 92/84; 102/14; 73/368.3

[56] References Cited
UNITED STATES PATENTS

| | | | |
|---|---|---|---|
| 2,519,427 | 8/1950 | Besmer | 43/43.14 |
| 2,534,497 | 12/1950 | Albright | 92/84 |
| 3,012,359 | 12/1961 | Foster | 43/43.14 |
| 3,179,962 | 4/1965 | Shear et al. | 102/14 |
| 3,212,337 | 10/1965 | McCarrick | 73/368.3 |
| 3,212,436 | 10/1965 | Michelson | 102/14 |
| 3,305,964 | 2/1967 | Wieszeck | 43/42.03 |
| 3,434,351 | 3/1969 | Poitras | 73/368.3 |
| 3,540,023 | 11/1970 | Potoroka, Sr. | 43/4 |
| 3,628,274 | 12/1971 | Wojahn | 43/42.22 |
| 3,753,311 | 8/1973 | Boone | 43/43.14 |

Primary Examiner—Warner H. Camp
Attorney, Agent, or Firm—Jacox & Meckstroth

[57] ABSTRACT

A device which seeks to maintain itself in a predetermined temperature region in a body of fluid having various temperature regions as the fluid displacement volume of the device is automatically varied with temperature. The device is particularly adapted for fishing, as a bait or lure or the like is maintained within or vertically oscillates through a predetermined temperature layer or stratum in a large body of water, such as a lake or ocean or the like. However, the device may have numerous other uses in which it is desired to maintain an instrument or the like in liquid of a given temperature in a body of liquid having regions of various temperature.

1 Claim, 5 Drawing Figures

U.S. Patent  Aug. 17, 1976  3,974,590
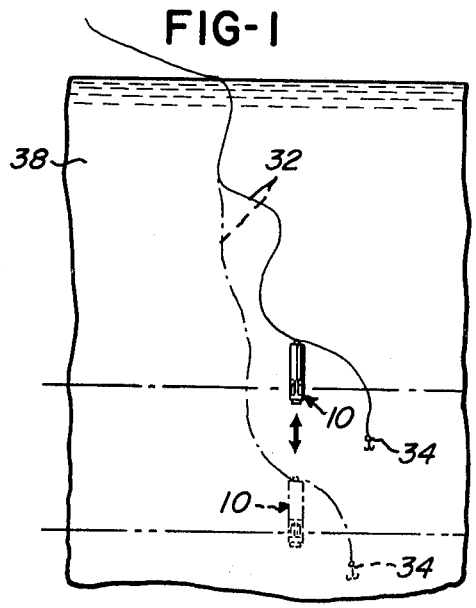
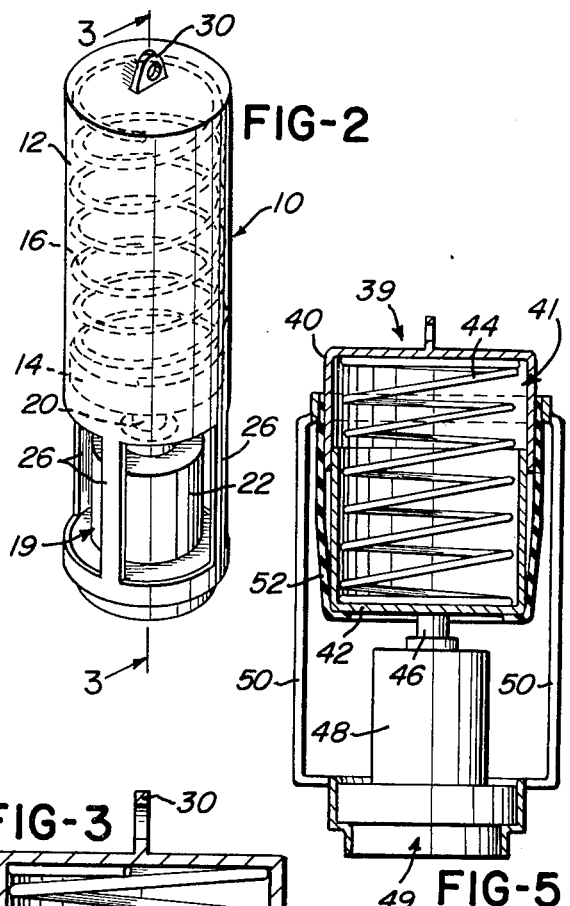
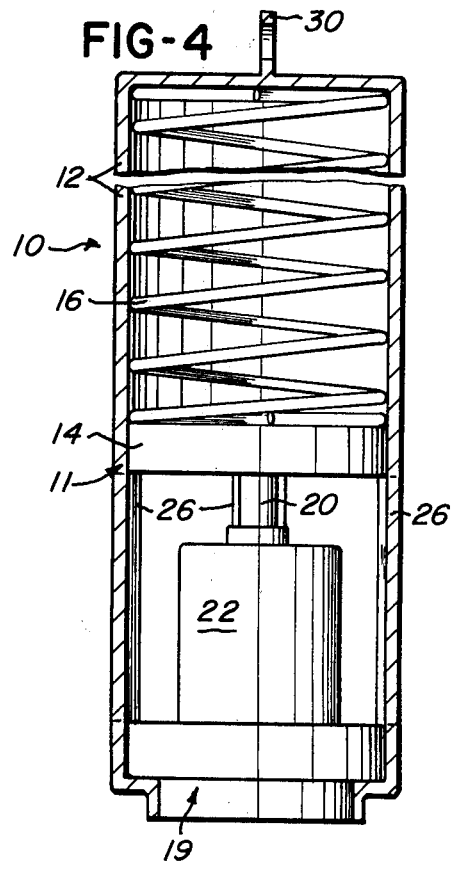
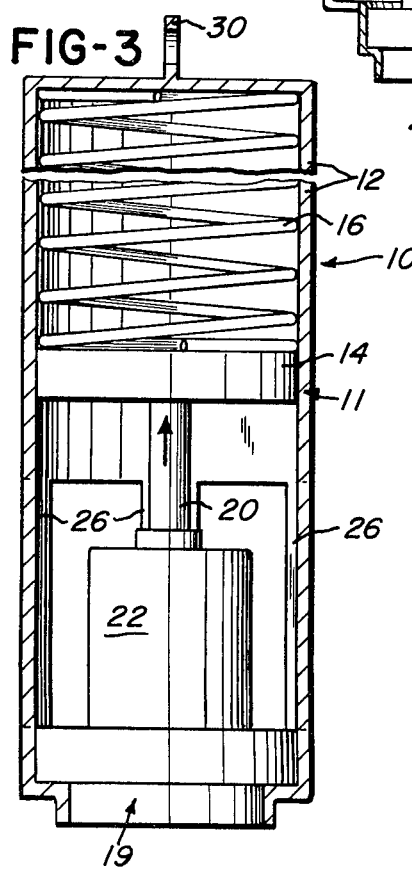

SUBMERSION DEVICE WHICH CHANGES CONFIGURATION IN RESPONSE TO TEMPERATURE

This application is a continuation of application Ser. No. 187,389 filed Oct. 7, 1971 and now U.S. Pat. No. 3,753,311.

BACKGROUND OF THE INVENTION

It is known that most fish prefer to live in water of a given temperature. One kind of fish may prefer water of about 55 degrees, while another kind of fish may prefer water of about 70 degrees, etc. In a large body of water, such as a lake or ocean or the like, the water is in layers or strata of various temperatures. For example, the water in a stratified lake during the summer months may be at a temperature of 80 degrees near the surface while the water about fifteen to twenty feet below the surface may have a temperature of 65 to 70 degrees, and water at depths more than 20 feet may have a temperature of 60 degrees or less. Thus, the body of water, such as a lake or the like, may be considered as being divided into temperature levels or layers or strata. In limnology, temperature layers are frequently referred to as epilimnology, thermocline and hypolimnion. The thermocline is defined as a layer in which the temperature of the stratum changes at least one degree centigrade per meter of depth. It has also been found that from day to day or from week to week in a given body of water, the temperatures at various depths change, as affected by weather conditions, subsurface current conditions, surface wind conditions, etc. It has also been found that water of a given temperature may be located a given distance below the surface at one area of a lake and water of the same temperature may be at a different distance below the surface at other areas of the lake.

Thus, fish which prefer water of a given temperature may be located at a given depth at a certain area of a lake on a certain day and at another depth a few days later. Furthermore, because of these water temperature conditions, fish which prefer water of a given temperature may be found at a given depth in one part of a lake and at another depth at another part of the lake.

Thus, it is understood that a highly desirable device for a fisherman is one which automatically maintains bait or lure or the like in water having a predetermined desired temperature, regardless of the depth involved.

Devices have been created which employ various means for maintaining an object at a given depth. However, such devices are ineffective to maintain a lure or bait in water of a predetermined desired temperature.

An object of this invention is to provide a device which seeks to maintain itself at or oscillate through a predetermined temperature stratum or layer in a body of water or other liquid which has numerous temperature strata or layers. Thus, if an appropriate type of instrument or the like is attached to the device and disposed adjacent the device, the instrument is maintained in substantially a predetermined temperature region in the body of liquid regardless of the depth of the temperature region within the limits of the device.

Other objects and advantages reside in the construction of parts, the combination thereof, the method of manufacture, and the mode of operation, as will become more apparent from the following description.

BRIEF DESCRIPTION OF THE VIEWS OF THE DRAWING

FIG. 1 is a diagrammatic view illustrating operation of a float device of this invention in a body of water.

FIG. 2 is a perspective view of a float device of this invention, drawn on a much larger scale than FIG. 1.

FIG. 3 is a sectional view taken substantially on line 3 — 3 of FIG. 2.

FIG. 4 is a sectional view similar to FIG. 3 but showing elements of the float device in another position of operation.

FIG. 5 is a sectional view of another float device of this invention.

DETAILED DESCRIPTION

A device 10 of this invention, as shown in FIGS. 1–4, comprises a body 11 which includes a shell 12, open at one end thereof, herein shown as being the lower end and a piston or movable wall 14 slidably disposed within the shell 12. The movable wall 14 engages the shell 12 in close fitting fluid-tight relation. Also within the shell 12 is a resilient member 16, in the form of a helical spring or the like, which urges the piston or movable wall 14 in a direction from the shell 12.

A thermally responsive actuator 19 is supported by arm members 26, which are attached to the shell 12 and extend therefrom. The thermally responsive actuator comprises a rod 20 and a rigid container 22. The rod 20 is attached to the piston or movable wall 14 and movably extends into the rigid container 22. The thermally responsive actuator 19 may be of any suitable type which is insensitive to external pressures, such as, or example, the thermally responsive actuator shown in any of U.S. Pat. Nos. 2,806,376; 2,714,759; 2,208,149 and 2,534,497. The thermally responsive actuator shown in each of these patents includes a rigid container having thermally responsive expansible-contractible material therein and an actuator rod which is partially within the container and which is movable in a direction from the container by expansion of the thermally responsive material. The thermally responsive material is any suitable material, such as, for example, a wax material or polyolefinic material as disclosed in the patents cited above, and known as heat motors or thermally responsive actuators. These materials can be formulated to provide a relatively large volumetric expansion over a given predetermined temperature range. In a device of this invention, thermally responsive material is employed which has relatively high volumetric expansion at the desired operating temperature of the device 10. For example, if the device 10 is to maintain itself in water having a temperature of approximately 65 degrees Fahrenheit, the thermally responsive material used within the container 22 may be formulated to provide its maximum volumetric expansion at approximately 65 degrees Fahrenheit.

OPERATION

The effective volume of the body 11 is changed by a change in the position of the piston 14 within the shell 12. For this reason, the fluid displacement volume of the device 10 is changed by a change in the position of the piston 14 within the shell 12. When the piston 14 is positioned a substantial distance within the shell 12, as illustrated in FIG. 3, the effective volume of the body 11, shown in FIG. 3, is less than that of the body 11, illustrated in FIG. 4. Thus, the fluid displacement volume of the device 10, shown in FIG. 3, is less than the fluid displacement volume of the device 10, illustrated in FIG. 4.

The device 10 is shown as having a lug 30 or the like attached to the shell 12 thereof, at the upper portion thereof. A fishing line 32, shown in FIG. 1, may be attached to the lug 30 and a bait or lure 34, or the like is attached to the fishing line 32 adjacent the lug 30. Alternatively, the device 10 may be constructed so as per se to constitute a lure.

When the float device 10 is placed into a body of water, such a body of water 38, shown in FIG. 1, the piston or movable wall 14 may be positioned as shown in FIG. 3. With the piston 14 so positioned, the effective fluid displacement volume of the device 10 is lower than necessary to permit the device 10 to float on the surface of the body of water 38. Thus, with the piston 14 so positioned in the shell 12, the device 10 moves downwardly or sinks in the water, As the device 10 moves downwardly in the body of water 38, the container 22 is subjected to water which is decreasingly lower in temperature. When the device 10 reaches water having a temperature substantially equal to that of a predetermined operating temperature of the device, the lower temperature permits the thermally responsive material in the container 22 to reduce in volume, and the resilient member 16 forces the piston 14 to move farther outwardly within the shell 12, as shown in FIG. 4.

The device 10 may, at least momentarily or for a short period of time, volumetrically balance itself within a temperature stratum of water so that upward and downward movement thereof is not appreciable. However, in its control operation, the thermally responsive actuator 19 may permit the resilient member 16 to move the piston outwardly to such an extent that the effective volume of the shell 12 increases to such a degree that the fluid displacement volume of the device 10 becomes less than that required for the device 10 to remain at a given depth. Then the device 10 begins to move toward the surface of the body of water 38. However, as the device 10 moves upwardly within the body of water 38, the container 22 comes into contact with water of higher temperatures, and the thermally responsive actuator 19 becomes warmer, and the rod 20 thereof moves outwardly from the container 22 and moves the piston 14 farther into the shell 12. Thus, the fluid displacement volume of the body 11 is reduced and the device 10 again moves downwardly in the water.

Therefore, it is understod that the device 10 may remain substantially stationary at a desired temperature level or the device 10 may move upwardly and downwardly within a desired temperature stratum, through a limited distance or limited range. The water within which the device 10 seeks to position itself is water which has a temperature which approximately corresponds to the predetermined control temperature of the thermally responsive actuator 19. The device 10, in seeking a predetermined temperature stratum, may oscillate upwardly and downwardly through and beyond the desired temperature stratum. This is particularly true in a narrow temperature stratum such as exists in the thermocline, or such action may occur if the thermally responsive actuator 19 of the device 10 has a low rate of response to temperature change. Thus, as the device 10 attempts to maintain itself in water having a temperature approximately equal to the control temperature of the thermally responsive actuator 19, the bait or lure 34 is maintained in or oscillates through a stratum of water having a temperature at which fishing is desired. If it is desired to have the bait or lure 34 disposed in water of a different temperature range, a device 10 is selected which has a thermally responsive actuator 19 which has the desired control temperature.

FIG. 5

A device 39 of this invention as shown in FIG. 5 comprises a body 41 which includes a shell 40 and a shell 42, in which the shell 42 has a portion slidably disposed within the shell 40. A resilient member 44 within the shells 40 and 42 urges separation thereof. A rod 46 is attached to the shell 42 for movement thereof. The rod 46 extends from a container 48, so that the rod 46 and the container 48 comprise a thermally responsive acutator member 49, similar to the actuator member 19, shown in FIGS. 2, 3 and 4.

The container 48 is attached to arm members 50 which are also attached to the shell 40.

An elastomeric sealing member 52 encompasses a portion of the shell 40 and the shell 42 and is attached thereto, and seals against flow of liquid therebetween.

The fluid displacement volume of the device 39 is directly dependent upon the effective volume of the shells 40 and 42. The effective volume is decreased as the shell 42 moves farther into the shell 40.

The device 39 thus functions in substantially the same manner as the device 10, as the shell 42 is moved farther into the shell 40 by the rod 46, and as the resilient member 44 urges movement of the shell members 40 and 42 in a direction one from the other.

The rate of operation of a thermally responsive device of this invention may be changed by changing the thermally responsive material or composition of materials, or by changing the thermal conductivity of the material or the thermal conductivity of the container of the thermally responsive material. Changing the rate of operation of the device alters the amplitude of vertical oscillatory movement which the device may have in or through a stratum of water having the desired temperature.

It is to be understod that a device of this invention is adaptable for many purposes, other than for fishing. A device of this invention may be employed in any function in which it is desired to maintain an element in a fluid of a given temperature, within a body of fluid having a plurality of temperatures.

It is also to be understood that a device of this invention may be constructed to function in a body of water in which the stratum of the lowest temperature is adjacent the surface and strata at increasing depths are of increasing temperatures. Such a condition may exist in a lake or pond or the like during cold winter months. A device of this invention for use in such conditions is one in which the thermally responsive actuator of the device causes the volume of the body member, such as the body member 11 or 41, to increase as temperatures increase.

Although the preferred embodiment of the device has been described, it will be understood that within the purview of this invention, various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. A device adapted to be submerged within a fluid of varying temperature regions, a hollow body member having a movable wall portion, movement of the movable wall portion changing the displacement volume of the device within the fluid, resilient means within the hollow body member and operable upon the movable wall portion and urging movement of the movable wall portion to increase the displacement volume of the hollow body member, a thermally responsive actuator operably joined to the movable wall portion and operable upon subjection of the device to temperatures above a predetermined value to move the movable wall portion to decrease the displacement volume of the hollow body member, the device having a weight generally equal to the volume of fluid displaced by the device when the device is submerged within the fluid in a predetermined temperature region.

* * * * *